United States Patent [19]

Slemmons

[11] 4,223,402

[45] Sep. 16, 1980

[54] CLOCK HAND LINKAGE AND SUPPORT ASSEMBLY

[75] Inventor: Charles O. Slemmons, Akron, Ohio

[73] Assignee: McNeil Corporation, Akron, Ohio

[21] Appl. No.: 77,756

[22] Filed: Sep. 20, 1979

[51] Int. Cl.[3] .................... G04B 19/04; G01D 13/22

[52] U.S. Cl. .................................... 368/238; 116/290

[58] Field of Search ............................... 58/7, 126 D; 116/DIG. 5, DIG. 21, 288, 290, 294, 301, 312, 314, 318

[56] References Cited

U.S. PATENT DOCUMENTS 3,184,912 5/1965 Freeburg .......................... 58/126 D

FOREIGN PATENT DOCUMENTS 281454 12/1927 United Kingdom ..................... 58/126

*Primary Examiner*—Edith S. Jackmon

*Attorney, Agent, or Firm*—Hamilton, Renner & Kenner

[57] ABSTRACT

A clock hand linkage and support assembly (10) for use with a clock drive mechanism (11) having limited driving torque and power supply and which rotationally increments a hand (14) in discrete intervals through a drive shaft (12) includes a hub (13) having a central portion (20) through which the drive shaft (12) may pass for free rotation about the drive shaft (12) and at least one angle bracket stay (24) for support of the hand (14). A compliant fastener (16) biases the hand (14) into flexible engagement with the angle bracket stay (24) preventing damage during shipment. A resilient drive linkage (18) is coupled to the drive shaft (12) by interference fit and is biased against the hub (13) by the compliant fastener (16) whereby the hand (14) may continually rotate with the hub (13) in controlled relation to the incremental movement of the drive shaft (12).

12 Claims, 2 Drawing Figures

CLOCK HAND LINKAGE AND SUPPORT ASSEMBLY

TECHNICAL FIELD

The present invention relates generally to clocks having limited driving power to rotationally increment the second hand in discrete intervals. More particularly, the present invention relates to a novel second hand linkage and support assembly for battery powered sport clocks.

BACKGROUND ART

Many athletic endeavors pit man against the clock. In order to monitor timed performance particularly for training purposes it is frequently desirable to have a large wall-mounted clock which can be readily seen at great distances and accurately keeps time in at most one second intervals. It is not uncommon for such clocks to have diameters or widths of three or more feet. Of course the length and mass of the clock's second hand has to be commensurate with these dimensions. As a consequence, large quantities of power are necessary to move the hand, and its linkage and support assemblies. Unfortunately, these clocks must frequently be utilized under conditions which do not permit access to conventional electrical power outlets, requiring that they contain independent power supplies such as batteries. These limited power supplies are severely overdrained by the size of the hands resulting in extremely short periods of useful operation before replacement of the power source is necessitated.

Attempts have been made to reduce the weight of the hands such as by constructing them of balsa wood or by utilizing hands of very short length. However, hands made from balsa wood are extremely fragile and almost inevitably break under the various stresses induced during shipment or in the athletic environment. Hands of relatively short length are difficult to read accurately from a distance.

Other difficulties have arisen in an effort to produce time clocks that are more accurate. Essentially all accurate, battery-driven clock drive mechanisms or movements presently commercially available provide drive shafts for hands that are to indicate second intervals which rotate in high discrete intervals, generally of one-half or whole second periods. A large hand, rigidly connected to the drive shaft, cannot be accelerated and decelerated as suddenly and rapidly as is necessary, resulting in continual substantial mechanical overshoot (or "wobble") in the hand, which, over a time period, tends to produce mechanical difficulties in the clock drive mechanism.

DISCLOSURE OF INVENTION

It is therefore, an object of the invention to provide a clock hand linkage and support assembly for use with a clock drive mechanism having limited driving torque and power supply and which rotationally increments a hand in discrete intervals through a drive shaft in which substantially reduced power levels are necessary to maintain operation thereof, permitting substantially extended periods of operation from one given, fixed power supply.

It is another object of the invention to provide a clock hand linkage and support assembly, as above, in which large but lightweight hands, easily visible from a distance, may be installed prior to shipment without significant probability of breakage in transit.

It is still another object of the invention to provide a clock hand linkage and support assembly, as above, in which the large hand utilized to indicate second intervals is not subject to substantial mechanical overshoot but rather moves in a smooth and continuous clockwise rotation.

It is yet another object of the invention to provide a clock hand linkage and support assembly, as above, in which a hub having at least one angle bracket is provided for supporting the clock hand and a compliant fastener biases the hand into flexible engagement with the hub so as to prevent damage to the hand during shipment.

It is a further object of the invention to provide a clock hand linkage and support assembly, as above, in which the resilient drive linkage is coupled to both the drive shaft and the hub, whereby the hand may continually rotate with the hub in controlled relation to the incremental movement of the drive shaft.

These and other objects and advantages of the present invention over existing prior art forms will become more apparent and fully understood from the following description in conjunction with the accompanying drawings.

In general, a clock hand linkage and support assembly for use with a clock drive mechanism having limited torque and power supply and which rotationally increments a hand in discrete intervals through a drive shaft comprises hub means having a central portion through which the drive shaft may pass for free rotation about the drive shaft and at least one angle bracket stay means for support of the hand, and compliant fastening means biasing the hand into flexible engagement with the angle bracket stay means. Resilient linkage means is coupled to the drive shaft and the hub means, whereby the hand may continually rotate with the hub means in controlled relation to the incremental movement of the drive shaft.

PREFERRED EMBODIMENT FOR CARRYING OUT THE INVENTION

Figure 2:
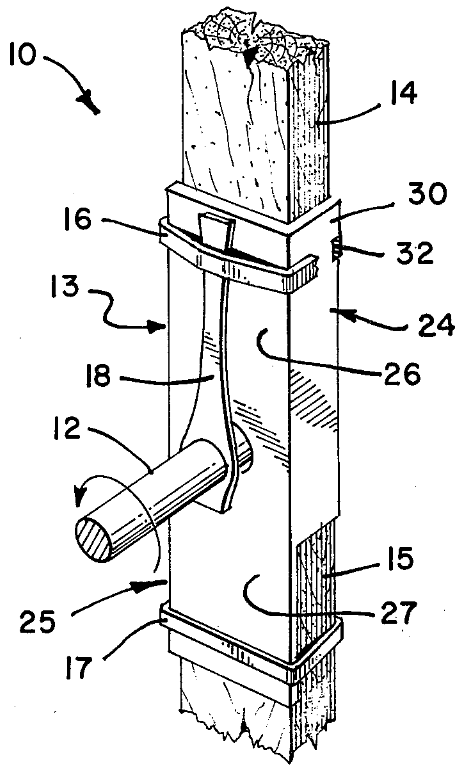
FIG. 2 is a rear perspective view of the exemplary clock hand linkage and support assembly depicted in FIG. 1 having two hands, showing in particular the resilient drive linkage.

The drawings depict an exemplary clock hand linkage and support assembly embodying the concepts of the present invention, indicated generally by the numeral 10. Assembly 10, which is driven by clock movement 11 through a second hand drive shaft 12, as detailed hereinafter, includes hub 13 for supporting clock hands 14, 15, compliant fasteners 16, 17 for biasing hands 14, 15 into flexible engagement with the hub 13, and a resilient drive linkage 18 coupled to the drive shaft 12 and hub 13. A clock face (not shown) is interposed between clock movement 11 and hub 13.

Clock movement 11 may be any conventional clock movement capable of operating with a self-contained, limited power supply such as a battery and which discretely, rotationally increments in a clockwise direction through drive shaft 12 a hand for indicating the elapse of seconds. Typically these discrete increments are for intervals indicating one-half or one full second, resulting in frequent periods of sudden and rapid acceleration, sudden and rapid deceleration, and immobility. Clock movement 11 may, where desired, also provide minute and hour hand drive shafts, normally coaxial with that of second hand drive shafts 12. However, inasmuch as the substantially lower rotational velocity of these hands permits the continuous rotation of their respective drive shafts, a clock hand linkage and support assembly 10 is unnecessary for those additional hands.

Hub 13 includes a central portion 20 having rectangular cavity 21 in the center of which is a boss 22 through which drive shaft 12 may pass and within which drive shaft 13 may freely rotate. The end of drive shaft 13 extending through the front of boss 22 may be flanged or provided with a retainer ring 23 to maintain hub 13 thereon.

Hub 13 further includes angle bracket stays 24, 25 which may be integrally formed on opposite ends of hub 13 central portion 20. Angle bracket stays 24, 25 have back members 26, 27, respectively, parallel to the clock face and formed continuous with the back of central portion 20, and side members 30, 31, respectively, at right angles to and along one side of back members 26, 27. Notches 32, 33 may be provided in side members 30, 31, respectively, near the radially outward ends thereof for positioning compliant fasteners 16, 17 surrounding one end of hands 14, 15 and angle brackets 26, 27, respectively, thereby biasing hands 14, 15 into flexible engagement with the hub 13. As a result of such flexible engagement, permitting resilient motion in three directions, hands 14, 15 may be engaged with hub 13 prior to shipment without risking damage thereto during shipment through inadvertent pressure upon hands 14, 15.

In order to minimize power usage necessary to drive hub 13 and hands 14, 15 and thereby conserve the total available power, it is preferable to make hands 14, 15 out of the lightest, rigid material available, such as balsa wood or a thin piece of low density plastic. For the same reasons it is preferable to form rectangular cavity 21 out of central portion 20 in hub 13 rather than carrying the additional mass of a solid central portion 20.

Resilient drive linkage 18 is coupled to the drive shaft 12 and to hub 13. Coupling of resilient drive linkage 18 to the drive shaft 12 may be any suitable means such as interference fit. Coupling of resilient drive linkage 18 to hub 13 may also be made by various suitable means such as direct attachment to hub 13, although it is preferred that either of compliant fasteners 16, 17 be utilized to flexibly bias resilient drive linkage 18 to hub 13 as shown in FIG. 2. Resilient drive linkage 18 must have a length substantially greater than its width and thickness in order to absorb abrupt changes in the velocity of the drive shaft 12 while transmitting the limited available torque to hub 13 and hands 14, 15.

Resilient drive linkage 18 must be made out of a material having a low modulus of elasticity and preferably having a small degree of hysteresis thereby permitting hands 14, 15 to continually rotate with hub 13 in controlled relation to the incremental movement of the drive shaft 12. In other words, resilient drive linkage 18 converts the jerky, discrete incremental motion of hands 14, 15 and hub 18 into a more efficient, continuous motion. In this manner, great amounts of energy otherwise expended by the power supply in frequently, suddenly and rapidly accelerating the large combined mass of hands 14, 15 and hub 13 and decelerating the same, may be cyclically stored in and metered out from resilient linkage 18 to hub 13 and ultimately hands 14, 15. The progress of hands 14, 15 still may be in noticeable steps, but mechanical overshoot and complete stops are substantially eliminated.

If resilient drive linkage 18 has too high a modulus of elasticity the drive shaft 12 torque is transmitted directly to hub 13 and hands 14, 15 resulting in the same mechanical overshoot difficulties experienced by prior art devices. On the other hand, if resilient drive linkage 18 has too low a modulus of elasticity it will simply absorb all the torque provided by drive shaft 12 and fail to transmit any torque until resilient drive linkage 18 becomes virtually knotted, producing erratic motion of hands 14, 15.

It is important to note that for assembly 10 to conserve energy hub 13 must be freely rotatable about the drive shaft 12. This enables drive shaft 12 to support the weight of hub 13 and hands 14, 15 while allowing resilient drive linkage 18 to transmit the torque, minimizing rotational friction.

Figure 1:
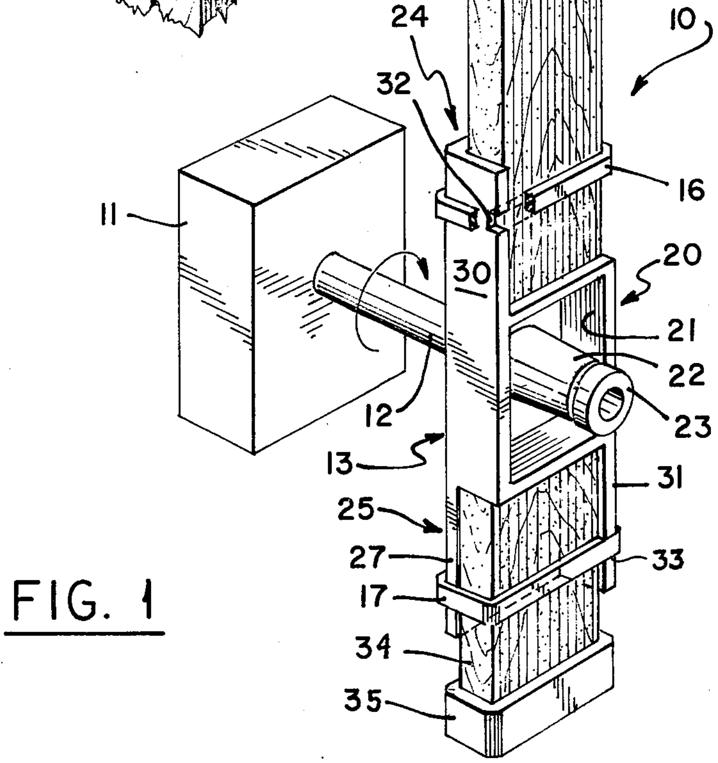
FIG. 1 is a front perspective view of an exemplary clock hand linkage and support assembly in accordance with the concepts of the present invention, illustrating in particular utilization of a second truncated hand and counterweight balance.

In some applications of assembly 10 it may be unnecessary or undesirable to have two hands 14, 15 180° apart, in which case either hand may be removed. However, to maintain minimal torque requirements it is necessary that the weight of hub 13 remain balanced about its center of gravity, the perpendicular axis through boss 22. Accordingly a suitable counterweight may be affixed to the angle bracket no longer engaged with a clock hand. The preferred method of balancing is to set the counterweight on a moment arm of suitable distance from the center of gravity, thereby permitting the utilization of a lower weight and reducing the load which must be driven by the torque supplied from the limited energy source. This can be achieved quite simply by suitably truncating the hand not to be used (e.g., 34) and mounting the counterweight 35 at the end thereof, as illustrated in FIG. 1.

Inasmuch as the present invention is subject to many variations, modifications and changes in detail, a number of which have been expressly stated herein, it is intended that all matter described throughout this entire specification or shown in the accompanying drawings be interpreted as illustrative and not in a limiting sense. It should thus be evident that a device constructed according to the concepts of the present invention, and reasonably equivalent thereto, will accomplish the objects of the present invention and otherwise substantially improve the art of operating clock drive mechanisms having limited driving power for extended periods of time.

I claim:

1. A clock hand linkage and support assembly for use with a clock drive mechanism having limited driving torque and power supply and which rotationally increments a hand in discrete intervals through a drive shaft, comprising:

hub means having a central portion through which the drive shaft may pass for free rotation about the drive shaft and at least one angle bracket stay means for support of the hand;

compliant fastening means biasing the hand into flexible engagement with said angle bracket stay means; and resilient linkage means coupled to the drive shaft and said hub means, whereby the hand may continually rotate with the hub means in controlled relation to the incremental movement of the drive shaft.

2. A clock hand linkage and support assembly, as set forth in claim 1, wherein said angle bracket stay means includes a back member and a side member at right angles to said back member.

3. A clock hand linkage and support assembly, as set forth in claim 1, wherein said resilient linkage means is coupled to the shaft by interference fit and has a length substantially greater than both its width and thickness.

4. A clock hand linkage and support assembly, as set forth in claim 3, wherein said resilient linkage means is biased against said hub means by said compliant fastening means.

5. A clock hand linkage and support assembly, as set forth in claims 2 or 4, wherein said compliant fastening means surrounds said angle bracket stay means.

6. A clock hand linkage and support assembly, as set forth in claim 5, wherein said angle bracket stay means includes notch means for positioning said compliant fastening means on said angle bracket stay means.

7. A clock hand linkage and support assembly, as set forth in claim 1, wherein said central portion includes a cavity in the center of which is boss means through which the drive shaft may pass and within which the drive shaft may freely rotate.

8. A clock hand linkage and support assembly, as set forth in claim 1, further including a second angle bracket stay means in association with said hub means opposite that of said angle bracket stay means.

9. A clock hand linkage and support assembly, as set forth in claim 8, further including counterweight means for balancing said hub means about the drive shaft.

10. A clock hand linkage and support assembly, as set forth in claim 9, wherein said counterweight means is affixed to said second angle bracket stay means.

11. A clock hand linkage and support assembly, as set forth in claim 8, further including second compliant fastening means biasing a second hand into flexible engagement with said second angle bracket stay means.

12. A clock hand linkage and support assembly, as set forth in claim 11, wherein said second hand is truncated and said counterweight means fastened thereto.

* * * * *